United States Patent
Schmit et al.

(10) Patent No.: US 11,284,096 B2
(45) Date of Patent: *Mar. 22, 2022

(54) METHODS AND APPARATUS FOR DECODING VIDEO USING RE-ORDERED MOTION VECTOR BUFFER

(71) Applicant: Advanced Micro Devices, Inc., Santa Clara, CA (US)

(72) Inventors: Michael L. Schmit, Cupertino, CA (US); Ashish Farmer, Mountain View, CA (US); Radhakrishna Giduthuri, Campbell, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/185,497

(22) Filed: Feb. 25, 2021

(65) Prior Publication Data
US 2021/0185333 A1 Jun. 17, 2021

Related U.S. Application Data

(63) Continuation of application No. 14/251,982, filed on Dec. 16, 2014, now Pat. No. 11,025,934.

(51) Int. Cl.
*H04N 19/43* (2014.01)
*H04N 19/436* (2014.01)
(Continued)

(52) U.S. Cl.
CPC ........... *H04N 19/43* (2014.11); *H04N 19/436* (2014.11); *H04N 19/129* (2014.11);
(Continued)

(58) Field of Classification Search
CPC ...... H04N 19/43; H04N 19/436; H04N 19/44; H04N 19/129; H04N 19/159; H04N 19/176; H04N 19/433
See application file for complete search history.

(56) References Cited

U.S. PATENT DOCUMENTS 5,717,441 A * 2/1998 Serizawa .................. G06T 1/60
345/571
5,828,423 A * 10/1998 Serizawa ................ G06T 7/223
348/699
(Continued)

OTHER PUBLICATIONS

U.S. Patent and Trademark Office; Non-Final Rejection; U.S. Appl. No. 14/571,982; dated Aug. 2, 2017.
(Continued)

*Primary Examiner* — Boubacar Abdou Tchoussou (57) ABSTRACT

A host processor, such as a central processing unit (CPU), programmed to execute a software driver that causes the host processor to generate a motion compensation command for a plurality of cores of a massively parallel processor, such as a graphics processing unit (GPU), to provide motion compensation for encoded video. The motion compensation command for the plurality of cores of the massively parallel processor contains executable instructions for processing a plurality of motion vectors grouped by a plurality of prediction modes from a re-ordered motion vector buffer by the plurality of cores of the massively parallel processor.

19 Claims, 6 Drawing Sheets

(51) Int. Cl.
  *H04N 19/44* (2014.01)
  *H04N 19/433* (2014.01)
  *H04N 19/159* (2014.01)
  *H04N 19/176* (2014.01)
  *H04N 19/129* (2014.01)

(52) U.S. Cl.
  CPC .......... *H04N 19/159* (2014.11); *H04N 19/176* (2014.11); *H04N 19/433* (2014.11); *H04N 19/44* (2014.11)

(56) References Cited

U.S. PATENT DOCUMENTS

| | | | |
|---|---|---|---|
| 6,122,320 | A | 9/2000 | Bellifemine |
| 6,870,960 | B2 | 3/2005 | Ogawa |
| 7,286,066 | B1 | 10/2007 | Ho |
| 7,403,564 | B2 | 7/2008 | Laksono |
| 8,335,256 | B2 | 12/2012 | Shumate |
| 8,560,795 | B2 | 10/2013 | Mei |
| 8,976,870 | B1 | 3/2015 | Cismas |
| 9,148,670 | B2 | 9/2015 | Kumar |
| 9,530,387 | B2 | 12/2016 | Amitay |
| 2002/0044693 | A1 | 4/2002 | Ogawa |
| 2005/0219069 | A1 | 10/2005 | Sato |
| 2008/0043845 | A1 | 2/2008 | Nakaishi |
| 2010/0124278 | A1 | 5/2010 | Shumate |
| 2013/0188715 | A1 | 7/2013 | Seregin |
| 2014/0126643 | A1 | 5/2014 | Park |
| 2016/0173896 | A1 | 6/2016 | Schmit et al. |

OTHER PUBLICATIONS

U.S. Patent and Trademark Office; Final Rejection; U.S. Appl. No. 14/571,982; dated Nov. 17, 2017.
U.S. Patent and Trademark Office; Non-Final Rejection; U.S. Appl. No. 14/571,982; dated Jun. 21, 2018.
U.S. Patent and Trademark Office; Final Rejection; U.S. Appl. No. 14/571,982; dated Dec. 26, 2018.
U.S. Patent and Trademark Office; Non-Final Rejection; U.S. Appl. No. 14/571,982; dated May 2, 2019.
U.S. Patent and Trademark Office; Final Rejection; U.S. Appl. No. 14/571,982; dated Oct. 3, 2019.
U.S. Patent and Trademark Office; Non-Final Rejection; U.S. Appl. No. 14/571,982; dated Feb. 27, 2020.

* cited by examiner

METHODS AND APPARATUS FOR DECODING VIDEO USING RE-ORDERED MOTION VECTOR BUFFER

RELATED APPLICATIONS

This application is a continuation application of U.S. application Ser. No. 14/571,982, filed on Dec. 16, 2014, having inventors Michael L. Schmit et al., titled "METHODS AND APPARATUS FOR DECODING VIDEO USING RE-ORDERED MOTION VECTOR BUFFER", which is owned by instant Assignee and is incorporated herein by reference.

FIELD OF THE DISCLOSURE

The disclosure relates generally to decoding motion vectors, and more particularly to re-ordering motion vectors as an entropy decoding stage decodes each motion vector.

BACKGROUND

Digital video is generally processed in sets of video frames. Each frame is a still image representing an instant in time of the video being processed. Each frame can further be broken down into blocks. The blocks are individually transmitted and then recombined to form a frame. The amount of data needed to represent the image blocks can become large. Motion compensation can be used to reduce the amount of data needed to represent the image blocks.

Using motion compensation, image blocks can be represented by motion compensation vectors and residual data. Motion compensation vectors are used to form prediction frames. For example, an object in one frame may simply be displaced either partially or fully into a new frame. Accordingly, the image blocks used to represent the object in the new frame may be processed with motion vectors, using the image blocks in the original frame as a reference. The motion vectors provide the direction and distance in which the referenced image blocks have moved to in the new, or predicted, frame. While the motion vectors may track an object, the temporal compression achieved by motion compensation is intended to reduce the bits required to reproduce the residual term, and as such need not necessarily track a specific object.

In some cases, motion compensation vectors are all that are needed to reproduce an image block. However, in many situations, some residual exists between the referenced image blocks and the blocks in the predicted frame. Residual data can be sent to recover the differences and adequately generate the image block. The residual data itself is basic image information, including the luminance of the pixels within the image block. A transform, such as a discrete cosine transform (DCT), can be used to reduce the size of the residual data to a transformed data set. The transformed data set includes transfer coefficients, which can then be inverse transformed to reproduce the residual data. In some cases, no motion vectors can be generated for a given image block. For example, when a video switches to a new scene, often none of the objects in the new frame can be referenced to objects in the previous frame. In such a case, the image block is represented only with residual data. Furthermore, some reference frames for motion compensation are made up of image blocks represented with only residual data. These frames are referred to as intra-frames, or I-frames. Predicted frames, or P-frames, are motion compensated frames that use previous I- or P-frames for reference. Bi-directional frames can use previous or upcoming I- or P-frames for reference.

To process the frame data, conventional video processing hardware is used to capture and process the motion compensation vector data and the residual data. The transformed data sets are inverse transformed, such as through an inverse discrete cosine transform (IDCT) component, to accurately reproduce the residual data. In some cases, very little or no motion compensation vector data may be present for a given block and most of the data will be related to residual data. The hardware must wait for the residual data to be fully processed before it can process or receive more motion compensation vector data. The hardware pipeline becomes stalled as it waits for the residual data to be processed. In other cases, when reconstruction of an image frame involves mostly motion compensation vector data and few IDCT operations, the IDCT component may become stalled as it waits for the hardware pipeline to process the motion compensation vector data.

Conventional systems force the hardware to be idle when the workloads between the IDCT operations and the motion compensation operations are not well balanced. Stalling the hardware reduces the efficiency with which frames of video are processed and increases the delay in which an image frame can be displayed.

In addition, there are many prediction modes in video compression standards such as Advanced Video Coding (AVC) video coding, also known as H.264 or MPEG-4, and the prediction mode being applied changes from macroblock to macroblock. Massively parallel processors, such as graphic processing units (GPUs), are known which include a separate motion compensation hardware portion. GPUs often use shader cores, such as vertex shaders and pixel shaders, which facilitate, for example, shading and other operations for rendering of images based on primitives such as triangles or other objects. Such rendering employs texture maps, as known in the art to apply, for example, textures to surfaces of objects. Massively parallel processors may perform numerous operations such as motion compensation prediction.

Such motion compensation prediction hardware is typically dedicated hardware, which can process, for example, AVC data. However, with different encoding schemes, such implementations may not effectively process encoded video. For example, with High Efficiency Video Coding (HEVC), also known as H.265, the successor to AVC, such dedicated AVC hardware may not sufficiently decode the encoded video and the additional hardware can increase the cost of the massively parallel processor. One of the reasons is that HEVC increased the basic block size from 16×16 pixels as in AVC to up to 64×64 pixels and allows for more prediction modes. Since the most efficient processing on a massively parallel processor is achieved when it processes the same type of workload, such as processing the block sizes with a common prediction mode, more prediction modes complicate massively parallel processor processing. A more efficient method for handling the additional prediction modes is desired. Although the instant disclosure is particularly relevant to GPUs and HEVC and subsequent versions thereof, it is not intended to be implemented in any particular system architecture or protocol.

The massively parallel processor cannot efficiently process workloads that exhibit numerous prediction modes processes in a random order. What is needed is a software driver-based re-ordering mechanism to operate on motion vectors associated with numerous prediction modes to re-order motion vectors based on prediction mode for efficient processing and minimum overhead.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Briefly, a massively parallel processor, such as a GPU, receives a motion compensation command for a plurality of cores, such as vertex shaders and pixel shaders of the massively parallel processor, to provide motion compensation for encoded video, and decodes the encoded video using the plurality of cores. The motion compensation command for the plurality of cores of the massively parallel processor contains executable instructions for processing a plurality of motion vectors grouped by a plurality of prediction modes from a re-ordered motion vector buffer by the plurality of cores of the massively parallel processor. As such, for example, some or all of the plurality of cores of the massively parallel processor process a plurality of motion vectors pertaining to one prediction mode before processing another plurality of motion vectors pertaining to a different prediction mode, thereby, among other advantages, increasing processing efficiency, providing high scalability, and minimizing divergence by the massively parallel processor.

In an embodiment, the plurality of motion vectors are sorted into a plurality of arrays based on the plurality of prediction modes prior to being transferred into the re-ordered motion vector buffer. In addition, the plurality of motion vectors are associated to a plurality of video reference frame block identifiers. The plurality of motion vectors are transferred into the re-ordered motion vector buffer when one of the plurality of arrays reach a threshold limit.

In an embodiment, decoding the encoded video using the plurality of cores of the massively parallel processor simultaneously in response to executing the motion compensation command includes using the plurality of cores to generate decoded video based on applying the plurality of motion vectors to a plurality of video reference frame blocks stored in memory of the massively parallel processor via the video reference frame block identifiers.

In an embodiment, the motion compensation command contains at least one pointer associated with at least one video reference frame block and wherein the at least one pointer causes the cores of the massively parallel processor to execute the instructions. Subsequent video frame blocks that need to be processed may receive motion compensation commands that include pointers to the motion compensation command and cause the cores to execute instructions that were previously sent or currently sent as part of the motion compensation command. The motion compensation command also contains data needed for predicting motion for an entire video prediction frame. For instance, motion vectors may be processed with pixel data related to a set of image data to generate at least part of an image.

Figure 1:
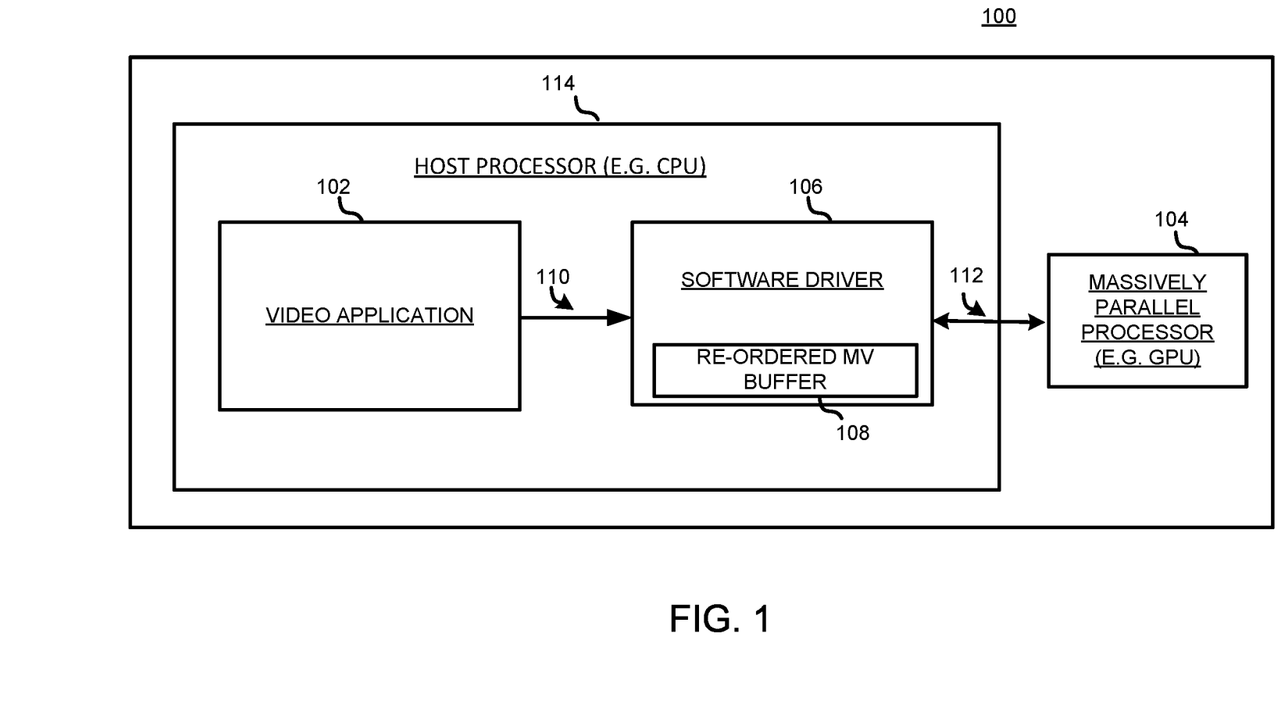
FIG. 1 is a block diagram illustrating one example of an apparatus employing a software driver utilizing a re-ordered motion vector buffer.

Referring now to FIG. 1, a block diagram illustrating one example of an apparatus employing a software driver 106 utilizing a re-ordered motion vector buffer 108 is shown. The example apparatus is a video processing system 100 for collecting and processing motion compensation video data. Software driver 106 is part of software located in memory, a computer readable medium storing instructions within the video processing system 100, and is executed with host processor 114, such as a central processing unit (CPU). The host processor 114 may be any fixed-function processor such as a microprocessor, application-specific integrated circuit (ASIC), or any other suitable processor used to supplement the functions of the host processor. Software driver 106 handles video requests generated by an application program, such as video application 102, and routes the video requests to massively parallel processor 104 where they can be processed. Video application 102 can include video applications such as digital video disk (DVD) player software, a digital television tuner, an application programming interface (API), video decoding software, and the likes. The video processing system 100 refers to any system that is capable of processing video information or transferring video information from one source to another. Examples include a single device, such as a computer, a personal digital assistant (PDA), a hand held computing device, a cable set-top box, an Internet capable device, such as a cellular phone, and the like. Alternatively, the video processing system 100 may refer to a collection of such devices.

MVs can be received through video application 102, which acts as a parser. The video application 102 parses a bitstream and extracts from it encoded video frame data to be decoded and information about encoding required for decoding from the parsed bitstream. The MVs are then sent to a software driver, such as software driver 106 via a communication link 110. Communication link 110 is a bus or any other suitable links. Software driver 106 receives the MVs from video application 102 and may decode the data if necessary, such as through an entropy decoder. The MVs are then stored in a re-ordered motion vector buffer 108 based on associated prediction mode. In one embodiment, an MV is associated with a video reference frame block covering a space of sixty four by sixty four pixels. It will be appreciated that other video reference frame block sizes can be used and can be altered without departing from the scope of the present invention.

Each MV is also associated with a block of a reference frame. To track the association between each MV and the block of the reference frame, unique video reference frame block identifiers are used to associate each MV to the video reference frame block. The frame block identifiers can be any unique value assigned to the MVs, such as a value which changes for each MV, such as from a counter, or a timestamp indicating when the MV was received, such as from a clock. The frame block identifiers can be stored in memory.

When MVs from the re-ordered motion vector buffer 108 are to be processed by the cores of the massively parallel processor 104, video reference frame blocks must also be present. Therefore, before the MVs are provided to the massively parallel processor 104, video reference frame blocks are presented to the massively parallel processor 104. Subsequently, MVs are sent by the software driver 106 from the re-ordered motion vector buffer 108 to a motion compensation processing component of the massively parallel processor 104 via motion compensation command 112. The massively parallel processor 104 processes MVs along with the video reference frame blocks retrieved from memory to generate video prediction frames. The video prediction frames can be stored in memory or delivered to a display device. It should be noted that while the massively parallel processor 104 is processing frame data related to one MV and the associated video reference frame block, the massively parallel processor 104 can process a second MV associated with a second video reference frame block.

Figure 2:
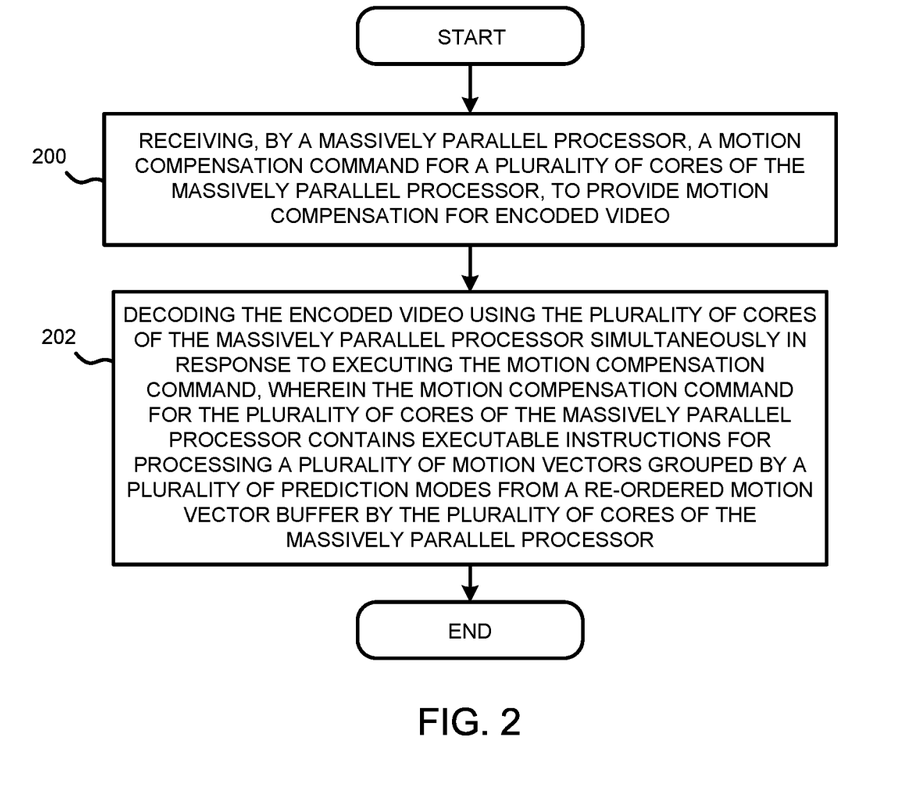
FIG. 2 is a flowchart generally illustrating an example of a method of decoding video.

Referring now to FIG. 2, a flowchart generally illustrating an example of a method of decoding video is shown. The flow chart describes a method for a software driver to handle video data for delivery to a video processing hardware. In block 200, the massively parallel processor 104 receives a motion compensation command from the software driver for a plurality of cores of the massively parallel processor 104 to provide motion compensation for encoded video. The motion compensation command contains executable instructions for processing a plurality of motion vectors grouped by a plurality of prediction modes from a re-ordered motion vector buffer 108 by the plurality of cores of the massively parallel processor 104. As previously discussed, individual frames of video are temporal-wise compressed using motion compensation. In one embodiment, the frame is broken down into blocks of pixel elements. A target block in a target frame is compared to a reference frame and motion compensation vectors are generated indicating the displacement of a reference block in the reference frame that best describes the target block. Differences between the target block and the reference block are transformed using a transform function such as a discrete cosine transform (DCT). In one embodiment, a block refers to a sixty four by sixty four set of pixels. As previously discussed, the image can also be broken down into multiple smaller blocks, such as sixteen by sixteen blocks of pixels. It will be appreciated that the image can be broken down into portions with sizes other than those discussed herein, without departing from the scope of the present invention.

In block 202, the massively parallel processor 104 decodes the encoded video using the plurality of cores of the massively parallel processor 104 simultaneously in response to executing the motion compensation command. In one embodiment, executing the motion compensation command includes applying the plurality of motion vectors to a plurality of video reference frame blocks stored in memory of the massively parallel processor 104 via the video reference frame block identifiers. By sending the motion compensation command, the software driver submits MVs stored in the re-ordered motion vector buffer 108 to the massively parallel processor 104. By noting the video reference frame block identifiers, the software driver identifies which of the stored MVs to submit. In one embodiment, the software driver sends the memory address in which the plurality of video reference frame blocks can be accessed. The massively parallel processor 104 can then read the memory address to access the plurality of video reference frame blocks for processing with the MVs. The massively parallel processor 104 processes the MVs with the plurality of video reference frame blocks to generate the video prediction frame. The plurality of motion vectors are processed by some or all of the plurality of cores of the massively parallel processor 104. The massively parallel processor 104 may send a notification to the software driver indicating that the massively parallel processor 104 has completed processing the motion compensation command. The notification also indicates that the massively parallel processor 104 is ready to receive additional motion compensation commands. The notification may be sent as an interrupt generated by the massively parallel processor 104.

While the massively parallel processor 104 is busy processing the MVs and the plurality of video reference frame blocks, the software driver can continue to submit more MVs to be processed. However, if the memory where the plurality of video reference frame blocks is stored is full, the software driver must wait until the massively parallel processor 104 has read the plurality of video reference frame blocks. In one embodiment, the massively parallel processor 104 sends a second notification to the software driver. Once the massively parallel processor 104 has read the plurality of video reference frame blocks from memory, the massively parallel processor 104 sends the second notification to the software driver. Once it receives the second notification, the software driver can free up the memory where the plurality of video reference frame blocks is being stored, allowing additional video reference frame blocks to be stored. The notification indicates that additional MVs can be sent to the massively parallel processor 104. In one embodiment, the second notification is an interrupt generated by the processing hardware.

Figure 3:
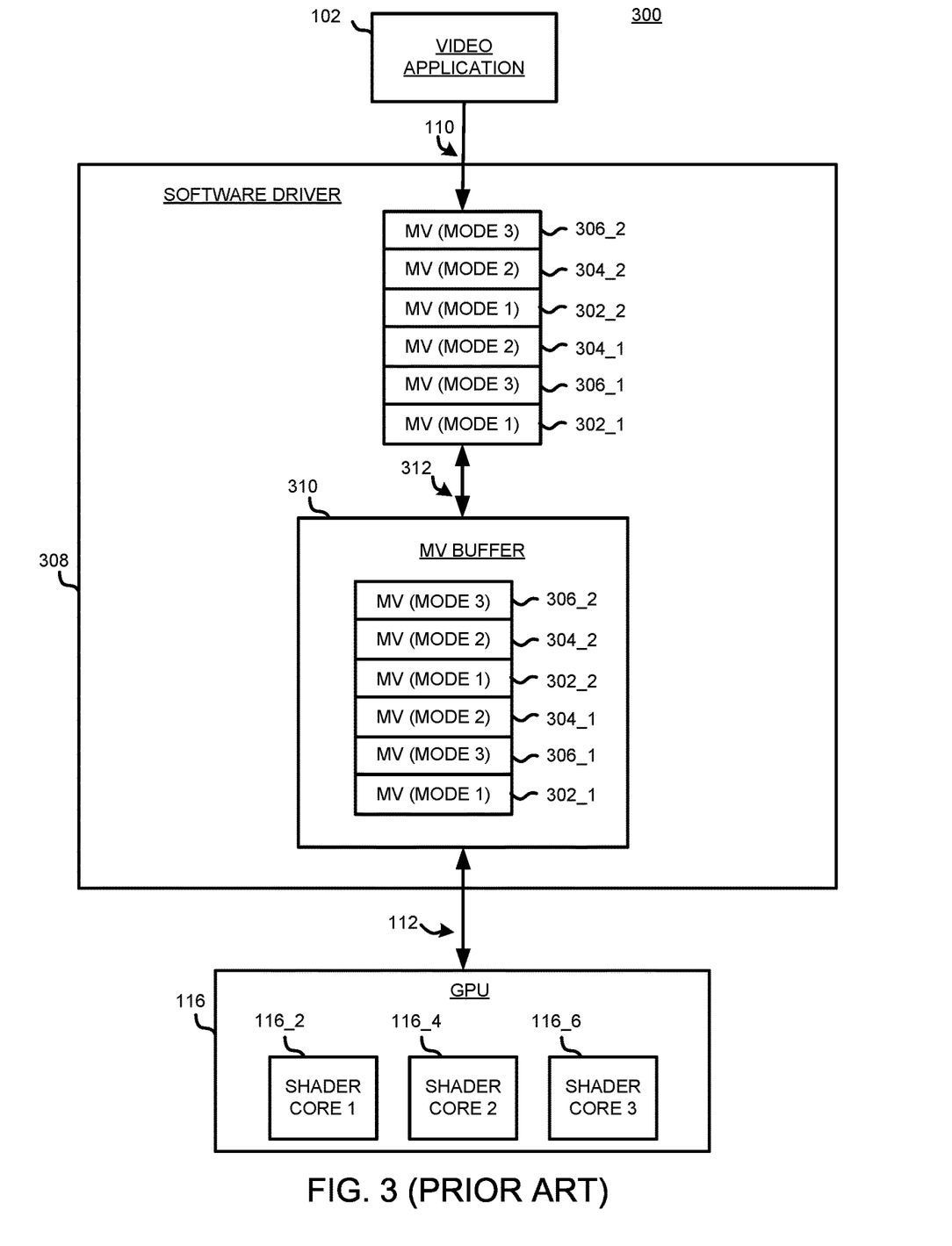
FIG. 3 is a block diagram illustrating one example of a prior art apparatus operating on un-ordered motion vectors.

Referring now to FIG. 3, a block diagram illustrating one example of a prior art apparatus operating on un-ordered motion vectors is shown. In general, software driver 308 handles video requests generated by an application program, such as video application 102, and routes the video requests to the plurality of shader cores 116_2, 116_4, and 116_6 of a GPU 116 where they can be processed. The software driver 308 receives MVs from video application 102 in a first-in manner, and stores the MVs in an un-ordered motion vector buffer 310 in a first-out manner. For example, software driver 308 receives MVs 302_1, 306_1, 304_1, 302_2, 304_2, and 306_2 in order, and stores the MVs in the same order in the un-ordered motion vector buffer 310. As such, the un-ordered motion vector buffer 310 holds MVs that are unsorted based on associated prediction modes. The MVs are held in the un-ordered motion vector buffer 310 until being sent to the GPU 116. The most efficient processing on a GPU 116 is achieved when it processes the same type of workload, such as processing MVs associated with a common prediction mode. As such, the GPU 116 cannot efficiently process workloads that exhibit numerous prediction modes processes in a random order. In addition, the HEVC standard compounds efficiency issues in the GPU 116 since HEVC increased the basic block size from 16×16 pixels as in the previous AVC standard to up to 64×64 pixels and allows for more prediction modes. What is needed is a software driver-based re-ordering mechanism to operate on motion vectors associated with numerous prediction modes to re-order motion vectors based on prediction mode for efficient processing and minimum overhead.

Figure 4:
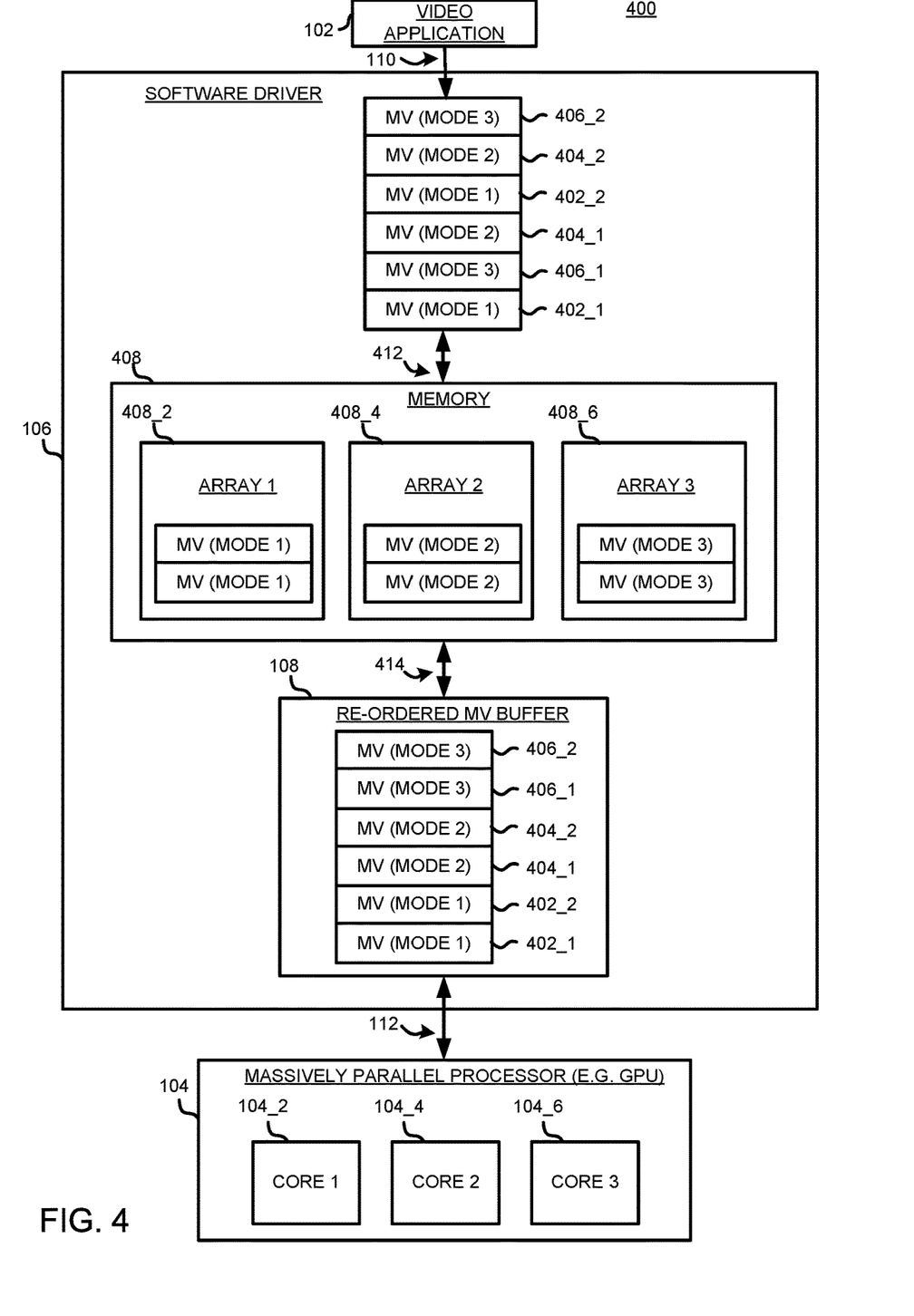
FIG. 4 is a block diagram illustrating one example of an apparatus of operating on re-ordered motion vectors.

Referring now to FIG. 4, a block diagram illustrating one example of an apparatus of operating on re-ordered motion vectors is shown. In general, software driver 106 handles video requests generated by an application program, such as video application 102, and routes the video requests to the massively parallel processor 104 where they can be processed. The software driver 106 receives MVs from video application 102 in a first-in manner, and distributes the MVs into arrays stored in memory 408 based on the prediction modes associated with the MVs. For example, since MVs 402_1 and 402_2 are each associated with a common prediction mode, MODE 1, the MVs are sorted into ARRAY 1 408_2. Similarly, since MVs 404_1 and 404_2 are each associated with a common prediction mode, MODE 2, the MVs are sorted into ARRAY 2 408_4. Similarly, since MVs 406_1 and 406_2 are each associated with a common prediction mode, MODE 3, the MVs are sorted into ARRAY 3 408_6. The software driver 106 may pre-define and allocate arrays in advance to associate with particular modes, or may assign the association and allocate arrays as MVs are being processed. Memory 408 can be system or cache memory such as random access memory (RAM). Other varied embodiments that incorporate the teachings of the invention may be easily constructed by those skilled in the art.

As MVs are grouped based on common prediction mode into the arrays, the MVs are subsequently sent by common prediction mode to the re-ordered motion vector buffer 108. In one embodiment, a group of MVs associated with a common prediction mode of an array may be sent to the re-ordered motion vector buffer 108 when the array becomes full. In another embodiment, a group of MVs associated with a common prediction mode of an array may be sent to the re-ordered motion vector buffer 108 when the array reaches a predetermined threshold. In another embodiment, after the software driver 106 completely distributes the MVs into arrays stored in memory 408 based on the prediction modes associated with the MVs, a group of MVs associated with a common prediction mode of an array may be sent to the re-ordered motion vector buffer 108 based on mode, the order in which the arrays became full, or the reverse order in which the arrays became full. As such, the re-ordered motion vector buffer 108 holds MVs that are sorted based on associated prediction modes. The MVs are held in the re-ordered motion vector buffer 108 until being sent to the massively parallel processor 104. The most efficient processing on a massively parallel processor 104 is achieved when it processes the same type of workload, such as processing MVs associated with a common prediction mode. As such, the massively parallel processor 104 can efficiently process workloads that exhibit numerous prediction modes processes in a sorted order. Other varied embodiments that incorporate the teachings of the invention may be easily constructed by those skilled in the art.

Once the re-ordered motion vector buffer 108 holds MVs that are sorted based on associated prediction modes, the software driver 106 sends a motion compensation command 112 to the massively parallel processor 104 to provide motion compensation for encoded video. The motion compensation command 112 for the plurality of cores 104_2, 104_4, and 104_6 of the massively parallel processor 104 contains executable instructions for processing the plurality of motion vectors grouped by the plurality of prediction modes from the re-ordered motion vector buffer 108 by the plurality of cores 104_2, 104_4, and 104_6 of the massively parallel processor 104. The motion compensation command 112 indicates whether some or all of the cores 104_2, 104_4, and 104_6 of the massively parallel processor 104 may process the plurality of motion vectors.

Figure 5:
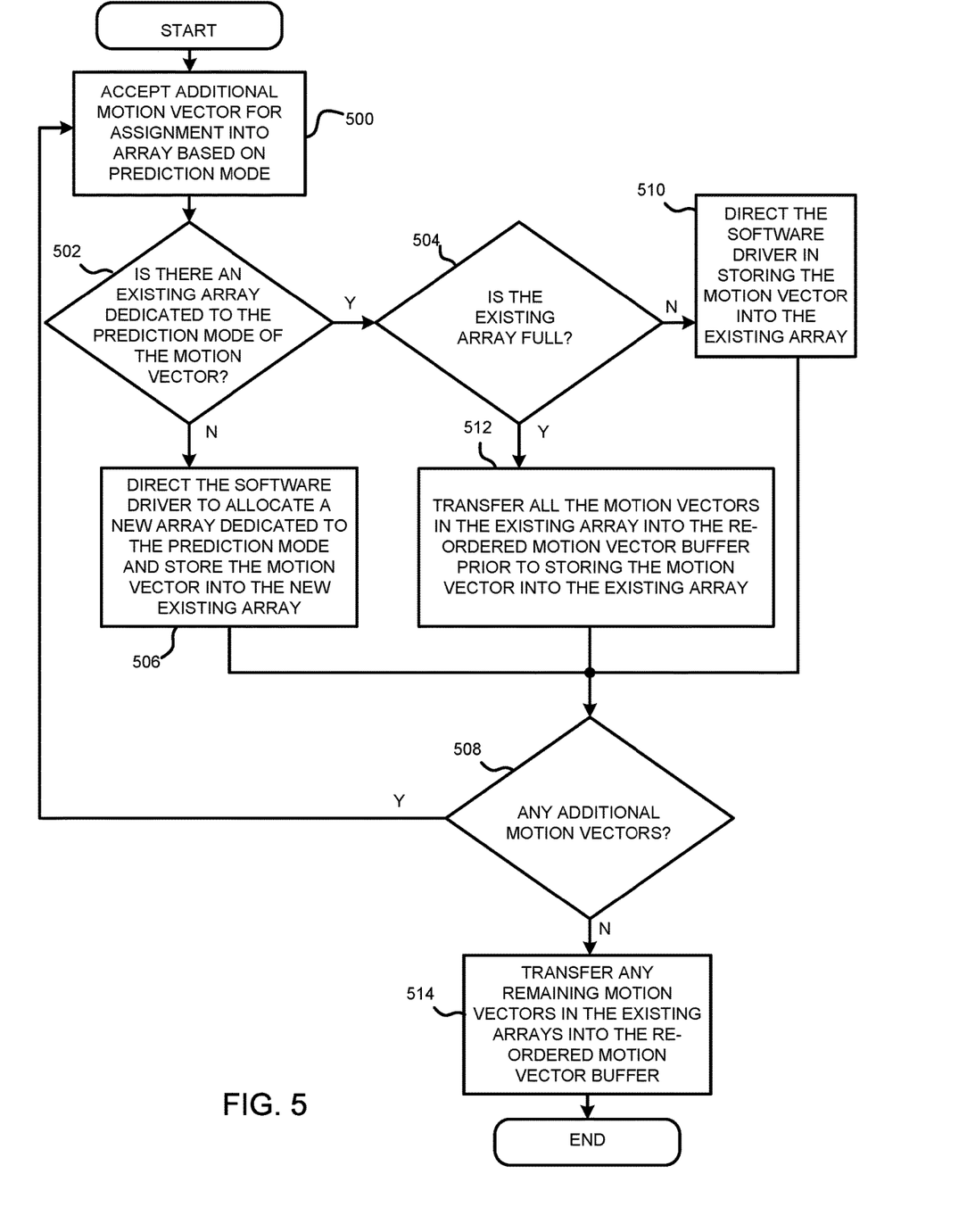
FIG. 5 is a flowchart illustrating, in more detail, an example of a method of re-ordering motion vectors.

Referring now to FIG. 5, a flowchart illustrating, in more detail, an example of a method of re-ordering motion vectors is shown. In block 500, software driver 106 accepts an additional MV for assignment into an array based on prediction mode. In block 502, software driver 106 determines if there is an existing array dedicated to the prediction mode of the MV. If there is, the software driver 106 determines if the existing array is full, as shown in block 504. If there is no existing array, the software driver 106 allocates a new array dedicated to the prediction mode and stores the MV in the new and existing array, as shown in block 506. If the existing array is full in block 504, software driver 106 transfers all the MVs in the existing array into the re-ordered motion vector buffer 108 prior to storing the MV into the existing array. If the existing array is not full in block 504, software driver 106 immediately stores the MV into the existing array. Subsequent to blocks 506, 512, and 510, software driver 106 determines if there are any additional MVs to process. If there are, the aforementioned blocks begin starting from block 500. If there are no additional MVs to process, software driver 106 transfers any remaining MVs in the existing arrays into the re-ordered motion vector buffer 108, as shown in block 514.

Figure 6:
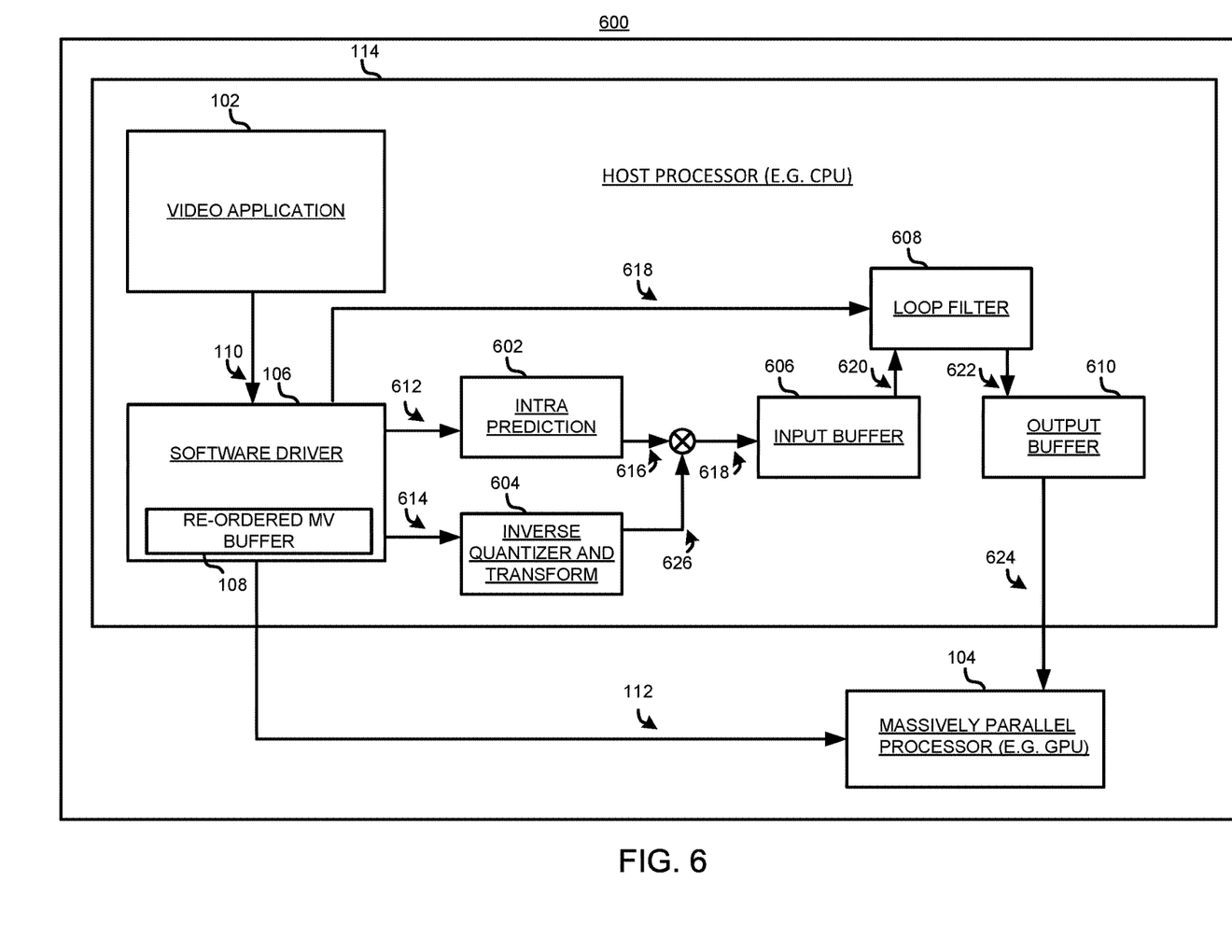
FIG. 6 is a block diagram illustrating more detail of an apparatus employing a software driver utilizing a re-ordered motion vector buffer.

Referring now to FIG. 6, a block diagram illustrating more detail of an apparatus employing a software driver 106 utilizing a re-ordered motion vector buffer 108 is shown. MVs can be received through video application 102. The MVs are then sent to software driver 106. Software driver 106 receives the MVs from video application 102 and may decode the data if necessary, such as through an entropy decoder. The MVs are then stored in a re-ordered motion vector buffer 108 based on associated prediction mode. The software driver 106 may carry out entropy decoding. Subsequently, MVs are sent by the software driver 106 from the re-ordered motion vector buffer 108 to the massively parallel processor 104 via motion compensation command 112. The massively parallel processor 104 processes MVs along with the video reference frame blocks retrieved from memory to generate video prediction frames. The video prediction frames can be stored in memory or delivered to a display device. It should be noted that while the massively parallel processor 104 is processing frame data related to one MV and the associated video reference frame block, the massively parallel processor 104 can process a second MV associated with a second video reference frame block.

Information for generating a reference frame from among the information decoded by the software driver 106 is provided to the intra prediction 602 via communication link 612 and residual data with which the software driver 106 has carried out entropy decoding may be provided to the inverse quantizer and transform 604 as coefficients 614. The inverse quantizer and transform 604 may apply inverse DCT based on parameters provided by the coefficients 614 to convert the coefficients 614 into pixel information 626.

The intra prediction 602 may generate a prediction block based on information about a block previously decoded. Intra prediction 602 may receive information fed from the software driver 106, as shown via communication link 612, such as prediction mode information, to determine whether the prediction block carries out intra prediction or motion compensation. The intra prediction 602 may generate a reference block comprising pixel information 616. By combining the reference block comprising pixel information 616 and residual data comprising pixel information 626, a reconstructed reference block may be provided to the input buffer 606 via communication link 618 prior to being provided to a loop filter 608 via communication link 620. The loop filter 608 may be a deblocking filter, a sample adaptive offset filter, an adaptive loop filter, or any suitable filter. If a deblocking filter is employed for instance, the software driver 106 may provide a deblocking filter strength indicator 618 to determine whether a strong or weak filter should be applied to the reconstructed reference block. The filtered reconstructed reference block is stored via communication link 622 in the output buffer 610 prior to sending it to be used as a reference block by the massively parallel processor 104 via communication link 624. Communication links 612, 618, 620, and 622 are busses or any other suitable links.

In the preceding detailed description of the preferred embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for decoding video, comprising:
   re-ordering motion vectors associated with blocks of video based on a prediction mode, into a different order from an initial order that motion vectors are received by sorting the motion vectors into the different order according to their associated prediction mode by grouping common prediction modes together, wherein at least some of the received motion vectors have different prediction modes, wherein each group comprises motion vectors having a common prediction mode;
   storing in a re-ordered motion vector buffer, the re-ordered motion vectors that are sorted into a different order from the initial order, in the groups having the common prediction mode; and
   decoding the encoded video using the stored re-ordered motion vectors.

2. The method of claim 1, wherein some of the plurality of motion vectors grouped by one of the plurality of prediction modes are processed by some of a plurality of cores of a parallel processor.

3. The method of claim 1, wherein some of the plurality of motion vectors grouped by one of the plurality of prediction modes are processed by all of a plurality of cores of a parallel processor.

4. The method of claim 1, wherein the plurality of motion vectors are sorted into a plurality of arrays based on the plurality of prediction modes prior to being transferred into the re-ordered motion vector buffer.

5. The method of claim 4, wherein the plurality of motion vectors are transferred into the re-ordered motion vector buffer when one of the plurality of arrays reach a threshold limit.

6. The method of claim 5, wherein the plurality of motion vectors are associated to a plurality of video reference frame block identifiers.

7. The method of claim 6, wherein decoding the encoded video is done using a plurality of cores of a parallel processor simultaneously in response to executing a motion compensation command by using the plurality of cores to generate decoded video based on applying the plurality of motion vectors to a plurality of video reference frame blocks stored in memory of the parallel processor via the video reference frame block identifiers.

8. A device for decoding video, comprising:
   a processor programmed to:
   re-order motion vectors associated with blocks of video based on a prediction mode into a different order from an initial order that motion vectors are received by sorting the motion vectors into the different order according to their associated prediction mode by grouping common prediction modes together, wherein at least some of the received motion vectors have different prediction modes, wherein each group comprises motion vectors having a common prediction mode; and
   store in a re-ordered motion vector buffer, the re-ordered motion vectors that are sorted into a different order from the initial order, in the groups having the common prediction mode.

9. The device of claim 8, wherein some of the plurality of motion vectors grouped by one of the plurality of prediction modes are processed by some of a plurality of cores of a parallel processor.

10. The device of claim 8, wherein some of the plurality of motion vectors grouped by one of the plurality of prediction modes are processed by all of a plurality of cores of a parallel processor.

11. The device of claim 8, wherein the plurality of motion vectors are sorted into a plurality of arrays based on the plurality of prediction modes prior to being transferred into the re-ordered motion vector buffer.

12. The device of claim 11, wherein the plurality of motion vectors are transferred into the re-ordered motion vector buffer when one of the plurality of arrays reach a threshold limit.

13. The device of claim 12, wherein the plurality of motion vectors are associated to a plurality of video reference frame block identifiers.

14. A system for decoding video, comprising:
   a first processor operative to:
   re-order motion vectors associated with blocks of video based on a prediction mode, into a different order from an initial order that motion vectors are received by sorting the motion vectors into the different order according to their associated prediction mode by grouping common prediction modes together, wherein at least some of the received motion vectors have different prediction modes, wherein each group comprises motion vectors having a common prediction mode; and
   store in a re-ordered motion vector buffer, the re-ordered motion vectors that are sorted into a different order from the initial order, in the groups having the common prediction mode; and
   a second processor operative to decode the encoded video using the stored re-ordered motion vectors.

15. The system of claim 14, wherein some of the plurality of motion vectors grouped by one of the plurality of prediction modes are processed by some of a plurality of cores of the second processor.

16. The system of claim 14, wherein some of the plurality of motion vectors grouped by one of the plurality of prediction modes are processed by all of a plurality of cores of the second processor.

17. The system of claim 14, wherein the plurality of motion vectors are transferred into the re-ordered motion vector buffer when one of the plurality of arrays reach a threshold limit.

18. The system of claim 17, wherein the plurality of motion vectors are associated to a plurality of video reference frame block identifiers.

19. The system of claim 18, wherein the first processor is further operative to cause the second processor to generate decoded video based on applying the plurality of motion vectors to a plurality of video reference frame blocks stored in memory of the second processor via the video reference frame block identifiers.

\* \* \* \* \*